United States Patent [19]

Thorp

[11] 4,258,832
[45] Mar. 31, 1981

[54] AUTOMATICALLY RESETTING SAFETY BRAKE

[75] Inventor: James T. Thorp, Edwardsville, Ill.

[73] Assignee: East Moline Metal Products Company, East Moline, Ill.

[21] Appl. No.: 81,048

[22] Filed: Oct. 2, 1979

[51] Int. Cl.³ .............................................. B60T 7/12
[52] U.S. Cl. .................................................. 188/184
[58] Field of Search ...................... 188/184, 185, 82.7, 188/82.74, 82.9, 72.3

[56] References Cited

U.S. PATENT DOCUMENTS

| | | | |
|---|---|---|---|
| 3,415,343 | 12/1968 | Svensson | 188/184 X |
| 4,015,696 | 4/1977 | Lichti | 188/184 X |
| 4,216,848 | 8/1980 | Shimodaira | 188/184 X |

Primary Examiner—Douglas C. Butler
Attorney, Agent, or Firm—Glenn H. Antrim

[57] ABSTRACT

Antifrictional screws are used to permit the resetting of safety brakes of the type used in hoists. As in prior brakes, centrifugally operated dogs connect braking members, but in the present brakes the dogs also engage actuating members of the antifrictional screws, the screws being rotatable independently of their respective braking members. The dogs can be disengaged from the actuating members by merely operating the usual controls to raise cages of the hoists. The antifrictional screws in one embodiment are then free to be turned automatically independent of the rate of rotation of a braking member by force of usual spring washers disposed between the screws and respective braking members until the brakes are normally released. In modified types, dogs or pawls for controlling the amount of braking continue to engage respective actuating members for controlling rate of rotation of the screws until the cages have been raised sufficiently to release the brakes. For testing purposes, the dogs have easily operated rods associated with them for pushing outwardly the dogs at speeds below the usual speeds required for operation. In heavy-duty hoists, second dogs positioned to clear the actuating members are included to provide a moderate amount of braking in an ascending direction.

6 Claims, 7 Drawing Figures

AUTOMATICALLY RESETTING SAFETY BRAKE

BACKGROUND OF THE INVENTION

This invention relates to safety brakes for stopping members of machines immediately after the members exceed predetermined safe speeds, and particularly to brakes of the type used on hoists, the brakes becoming effective as speeds of descent exceed a predetermined rate to increase braking until platforms, or cages, of the hoists are stopped.

The present improvement in safety brakes is described particularly with respect to hoists of the type used either in construction or repair of buildings. For example, typical hoists have towers constructed of lattices of steel angle iron, and the towers support along respective sides vertically movable platforms or cages for elevating workmen and materials. The cages are guided by rollers along vertical members and propelled by motors having pinions engaging vertical racks. The motors are controlled to raise or to lower the cages, and regulators associated with the drives of the motors determine usual maximum speeds. In the event that regulators associated with the motors should fail to regulate the maximum speed of the cages, safety brakes also having respective gears engaging the racks are provided to stop the cages.

Commonly safety brakes are effective only in the direction of descent to prevent dangerously fast speeds caused by weight of the cages and their loads. When the input gears of the safety brakes rotate faster than a desired maximum rate, respective centrifugal controls associated with the brakes engage respective braking members. As soon as the safety brakes begin to operate, braking force is rapidly increased until the cages are stopped. The rate in change of braking is sufficient to stop the cages quickly, but not so abrupt as to cause damage. After the brakes have been operated sufficiently to stop the cages, the brakes must obviously be reset before the cages can be moved again. To release the brakes and reset them for subsequent use, workmen usually have to be raised to the positions of the cages and use machine tools, and sometimes special tools, to reposition actuators as required for releasing the brakes and preparing them for subsequent operation.

SUMMARY OF THE INVENTION

Brakes according to the present invention have actuators that are reset automatically in response to operation of usual controls for raising hoists. The new actuators use antifrictional screws, such as screws having ball bearings between threads, and the actuators for these screws are reset automatically as the screws are rotated by force supplied from usual spring washers.

A brief description of a prior safety brake aids in understanding the present improvement. A centrifugal control assembly is connected to an input pinion engaging a rack of a hoist, and a dog of a control assembly is positioned inside a drum of a brake assembly. When the dog is thrown outwardly by centrifugal force, it engages the drum such that the drum is connected to the pinion and is rotated with the gear. An axial, extending portion of the drum has an external threaded portion that mates with inside threads of a nut. Movable braking disks are attached to the drum, and the movable braking disks are interleaved with fixed braking disks. As the drum is rotated by engagement of the dog, the nut is moved axially along the threaded portion of the drum to apply force for compressing together the movable braking disks and the fixed braking disks until the cage being controlled is stopped. In order to release the prior brake after operation, screws must be removed to have access to the nut, and the nut must be turned by a wrench.

According to the present improvement, a screw portion for compressing the braking disks is separated from the drum to which the movable disks are attached. A screw rather than a portion of the drum for actuating the brake is the type commonly used in machine tools for raising their beds. Ball bearings disposed between the threads of the screw and the threads of the nut decrease friction such that the screw is very easily turned in the nut. An end of the screw bears against the center of the drum having the movable braking disks, and has a radially extending actuator with a contact portion adjacent teeth within the inside wall of the drum. When a cage to which the safety brake is attached begins to descend at an excessive rate, the dog of the centrifugal control assembly contacts a tooth of the drum, and simultaneously overlaps into the space containing the actuator to contact and to operate the actuator. While the input pinion of the safety brake continues to be rotated, it moves the ball nut that applies force through spring washers to compress the braking disk. However, after the improved brake has stopped the cage, it can be reset by merely operating the controls of the hoist to raise the cage. The raising of the cage of one embodiment releases the dog so that it no longer engages either the drum or the actuator, and the screw is then free to be turned by force supplied by the spring washers until the brake is released. In another embodiment, the dog has a smaller portion that is pivoted on a larger portion, and the smaller portion stays in contact with the actuator while the brake is released to its normal condition.

An optional improvement utilizes a second dog. The second dog engages the tooth on the drum in response to rotation of the input pinion in a reverse or an ascending direction at a rate above a predetermined maximum rate. This second dog is more narrow than the usual dog and does not contact the actuator for increasing braking force. However, the dog rotates the drum in a reverse direction, and braking is applied by having the spring washers initially apply sufficient force to the braking disk to provide a moderate amount of braking. This amount of braking is sufficient to stop the cage of a hoist as it travels upwardly by force applied by a counterweight.

Since regulators associated with the driving motors normally limit the rate of travel of the cages to a rate slower than that at which the safety brakes are operated, the regulators have previously had to be disabled for testing the amounts of braking. After the regulators are disabled, the cages are allowed to descend fast enough to operate the centrifugal controls for operating the brakes. In a safety brake according to this invention, a dog that connects the brake during rapid descent of a cage has a pin for moving the dog outwardly in engagement with a drum of the brake. The pin is moved outwardly by being contacted by a rod when a button attached to the rod is pressed manually. Therefore, by pressing the button, the safety brake is actuated at any speed while the regulators are connected as usual.

DESCRIPTION OF THE PREFERRED EMBODIMENTS

Figure 1:
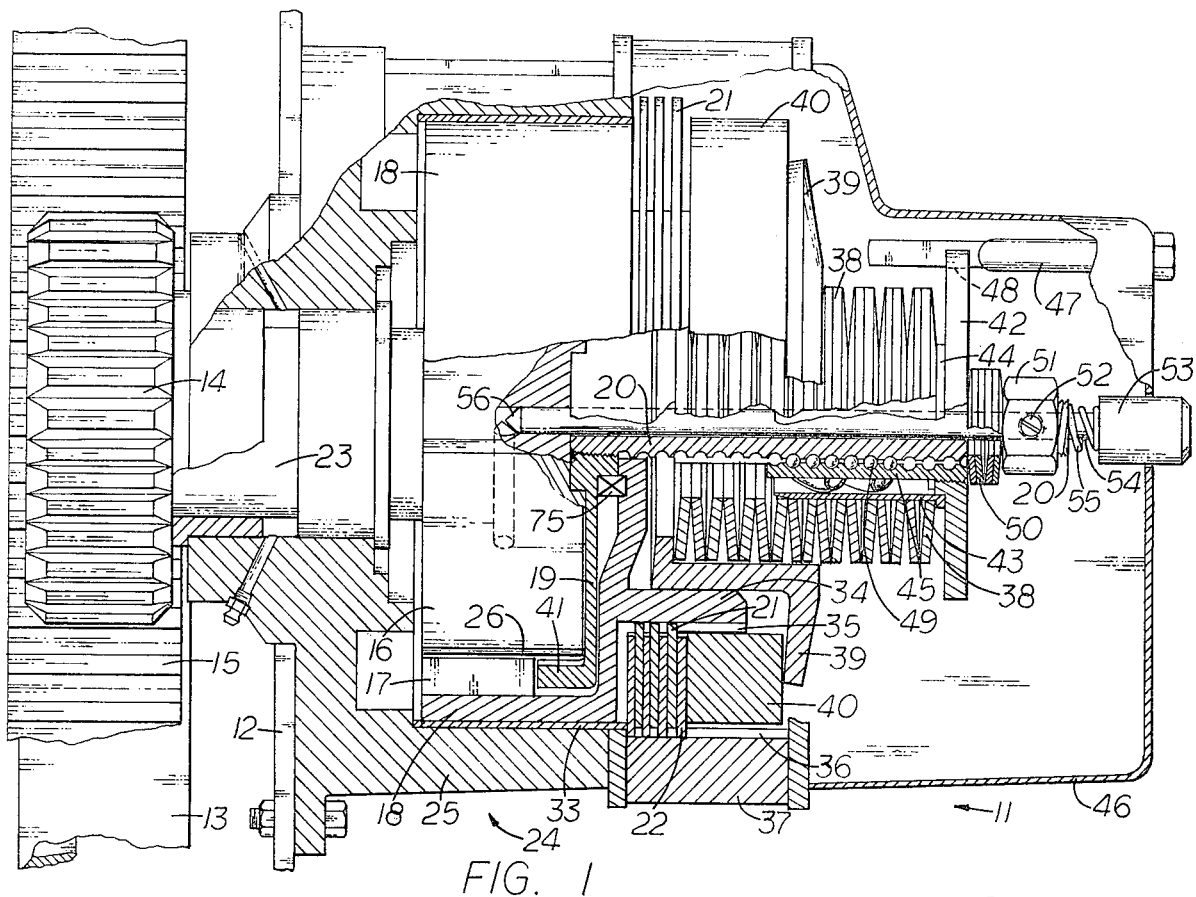
FIG. 1 is a side view of the safety brake of this invention having portions cut away and portions in cross section.

The safety brake 11 of FIG. 1 is fixed to a member 13 of a cage of a hoist, and the cage is movably attached for vertical movement to members 13 of a tower of lattice steel. A vertical rack 15 attached to the tower is positioned to be engaged by a pinion 14 of the safety brake 11. Briefly, when the cage descends at a rate faster than a predetermined safe speed, for example, 210 feet (64 m) per minute, a dog 16 is moved outwardly centrifugally to engage a tab 41 of an actuator 19 and a tooth 17 of a drum 18. The drum 18 and attached braking disks 21 rotate with the pinion 14, and also the actuator 19 rotates for rotating antifrictional or ball screw 20. A nut 45 of the screw 20 moves axially to compress together movable braking disks 21 and fixed braking disks 22 until braking is sufficient to stop the descent of the cage.

Figure 2:
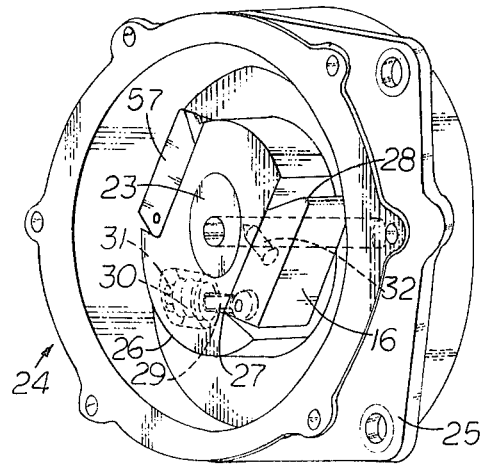
FIG. 2 is a perspective end view of a centrifugal control assembly of the brake.

The pinion 14 is connected to the outer end of a shaft 13 of a centrifugal control assembly 24 that is shown in perspective in FIG. 2. The shaft 23 extends through a sleeve bearing (FIG. 1) in the end of a housing 25, and an assembly including the dog 16 to be centrifugally actuated is connected to the opposite or inner end of the shaft 23. The assembly at the inner end of the shaft 23 includes a member or lobe 26 extending radially from the shaft 23, and the lobe has an arcuate portion and at least one adjacent angular cutout at its circumference, the angle included between straight sides of the cutout being somewhat greater than a right angle. The dog 16 is positioned within this cutout portion such that a heel 27 of the dog is included within the angle, and a toe 28 on the opposite end is positioned outwardly. A rod 29 extends from the heel 27 through a diagonal bore within the lobe 26. A spring 30 is also positioned within the bore about the rod 29, and the opposite end of the rod is threaded to receive an adjusting nut 31. The nut 31 is adjustable to change the amount of compression of the spring 30 for determining at which speed the toe 28 of the dog 16 will be thrown out by centrifugal force to actuate the safety brake. A pin 32 extends from an intermediate portion of the inner side of the dog 16 radially through a bore within the lobe 26 to an axial bore in the inner end of the shaft 23. The inner end of the pin 32 is a rounded apex of a cone and is normally positioned within the axial bore to be contacted as described below for testing the safety brake 11 at slower speeds than the speed normally required for centrifugally moving the dog 16.

Figure 3:
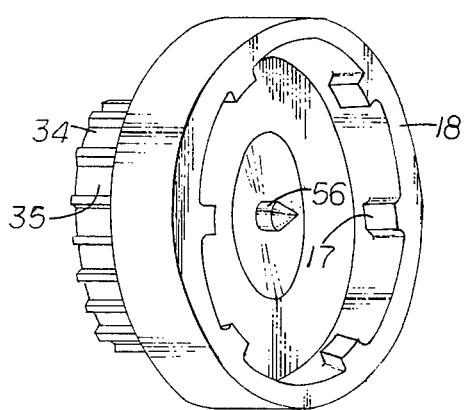
FIG. 3 is a perspective end view of a drum showing teeth to be engaged by dogs shown in FIG. 2.

The portion of the housing 25 of the centrifugal control assembly 24 radially opposite the dog 16 is cylindrical and has within its inner wall a ring-shaped bearing 33. With reference to FIG. 3, a cylindrical portion at one end of a drum 18 fits within the bearing 33 and is rotatable therein. The inside surface of the cylindrical portion of the drum 18 within the centrifugal control assembly 24 has six equally spaced inward projections or teeth 17 that are positioned radially opposite the dog 16. The teeth 17 as shown in FIG. 1 extend in an axial direction from the edge of the drum 18 to an intermediate point spaced from the radial wall of the drum. The path of rotation of inwardly turned tabs 41 of the actuator 19 is in the space between each of the teeth 17 and the radial wall of the drum 18.

In addition to the cylindrical portion with the internal teeth 17, the drum 18 has a smaller cylindrical portion 34 facing in the opposite axial direction. The exterior cylindrical wall of the smaller portion 34 has a plurality of equally spaced external slots 35 for receiving respective internal tabs or ears of the steel movable braking disks 21. The disks 21 are interleaved with bronze braking disks 22 that are not rotatable. An intermediate annular portion 37 of the housing of the safety brake 11 has slots 36 within its inside wall, and the braking disks 22 have external tabs extending into the slots. Force from rotation of the ball screw 20 is applied from one end of the stack of washers 38 through an adapter 39 and an annular spacer 40 to compress the interleaved disks 21 and 22 between the spacer 40 and a shoulder on the drum 18. The adapter 39 has a cylindrical portion that is a sliding fit within the smaller cylinder 34 of the drum 18, and a short inwardly turned flange from the inner rim of the cylindrical portion is in contact with the end of the stack of washers 38. The opposite rim of the cylindrical portion is outside the cylinder 34 and has an outwardly turned flange at an angle somewhat smaller than a right angle such that the outer edge of the flange contacts the wall of the annular spacer 40 that is opposite the braking disks 21 and 22.

Figure 4:
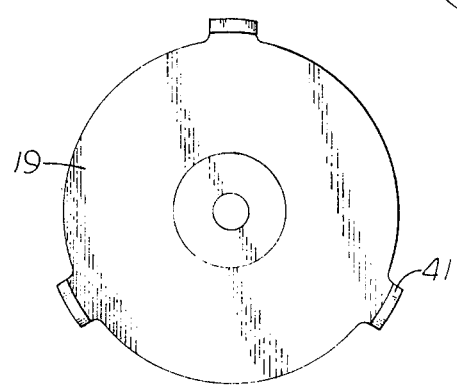
FIG. 4 is an end view of an actuating member to be contacted for operating the brake.

The actuator 19 of the ball screw 20 as shown in FIG. 4 is a disk with three right-angle tabs 41 equally spaced on its rim, one of the tabs to be engaged by the dog 16 when the safety brake is to be operated. With reference to FIG. 1, the hub of the actuator 19 is secured tightly to an end of the ball screw 20. The hub of the actuator 19 is adjacent a coaxial inner end of the input shaft 23 and has a ball bearing 74 disposed between the opposite side of the hub and an adjacent portion of the drum 18. The ball screw extends from the hub of the actuator near the end of the shaft 23 through the center of the small cylinder 34 of the drum 18, through the stack of spring or Belleville washers 38, and through a nut 45. The outer end of the nut 45 is connected to a supporting disk 42. The spring washers 38 at the inner end of the stack are contained axially about the screw 20 by being disposed within the adapter 39, and the remaining washers in the stack are a sliding fit about a sleeve 43 outside the nut 45. The sleeve 43 has a flange 44 between an outer end of the stack of washers 38 and the supporting disk 42.

Although the supporting disk 42 must prevent rotation of the nut 45, the nut must be free to move axially a short distance required for operating the safety brake 11. A suitable means of retaining the supporting disk 42 comprises three equally spaced pins 47, one of which is shown in FIG. 1, extending inwardly from the end of the portion 46 of the housing of the safety brake 11. The inner end of each of the pins 47 extends through a respective slot 48 within the annular edge of the supporting disk 42.

The ball screw 20 is a type commercially available and is used on machine tools. Friction between the screw 20 and its nut 45 is small because ball bearings 49 are between external threads or spiral grooves of the screw 20 and the internal threads or spiral grooves of the nut 45. The ball bearing shown between the nut 45 and the sleeve 43 in FIG. 1 is in a return channel through which the ball bearings 49 circulate.

The position to which the supporting disk 42 is returned automatically when the safety brake 11 is released is determined by a stack of smaller Belleville washers 50. The outer end of the ball screw 20 is threaded, and a plurality of Belleville washers, for example four washers, are placed over the end of the ball screw 20 to contact an outer end of the ball nut 45, and then a nut 51 is tightened on the end of the screw to a position required for stopping the ball nut 43 in a desired position when the safety brake 11 is released. The nut 51 has a conventional set screw 52 for locking the nut after it is correctly positioned.

In heavy-duty models where the force supplied by the spring washers 38 is great, the screw 20 with its actuator 19 will rotate at a high rate when the only opposition while the brake 11 is being reset is the small amount of friction between the screw 20 and the nut 45. Because of the inertia of the screw 20 and the actuator 19, the nut 45 is driven with damaging force against the washers 50 and the nut 51 to cause loosening of the nut 51 of any convenient size fabricated from usual materials. In order to prevent damaging impact against the nut 51, either a controlled amount of friction needs to be applied directly to the screw 20, or its actuator 19, or the rate of rotation needs to be controlled by the rate of the movement of another member of the brake 11.

Figure 6:
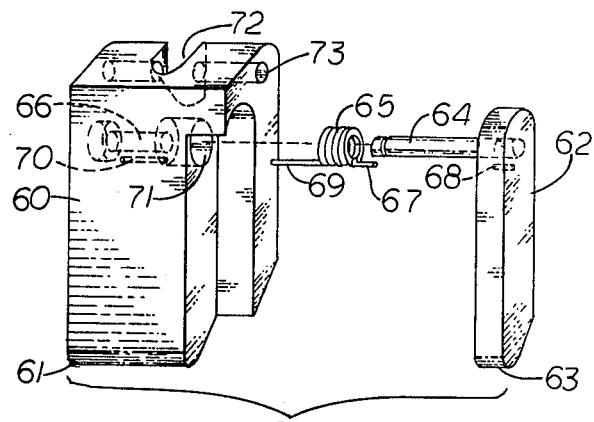
FIG. 6 is a perspective exploded view of a two-piece dog preferred in heavy-duty, pre-loaded brakes.

A preferred means of controlling the rate of rotation of the screw 20 while it is being reset includes the use of a two-piece dog 59 of FIG. 6 in place of the solid dog 16 of FIGS. 1 and 2. As a cage begins to ascend for resetting the brake 11, an auxiliary piece 62 of the dog 59 follows a tab 41 of the actuator 19 to control the rate of rotation of the screw 20 and remains in contact with the tab 41 until the auxiliary piece 62 is retracted when the brake 11 has been reset. A main piece 60 of the dog 59 has a toe 61 positioned to contact the teeth 17, and the auxiliary piece 62 has an adjacent toe 63 to contact the tabs 41 of the actuator 19.

Figure 7:
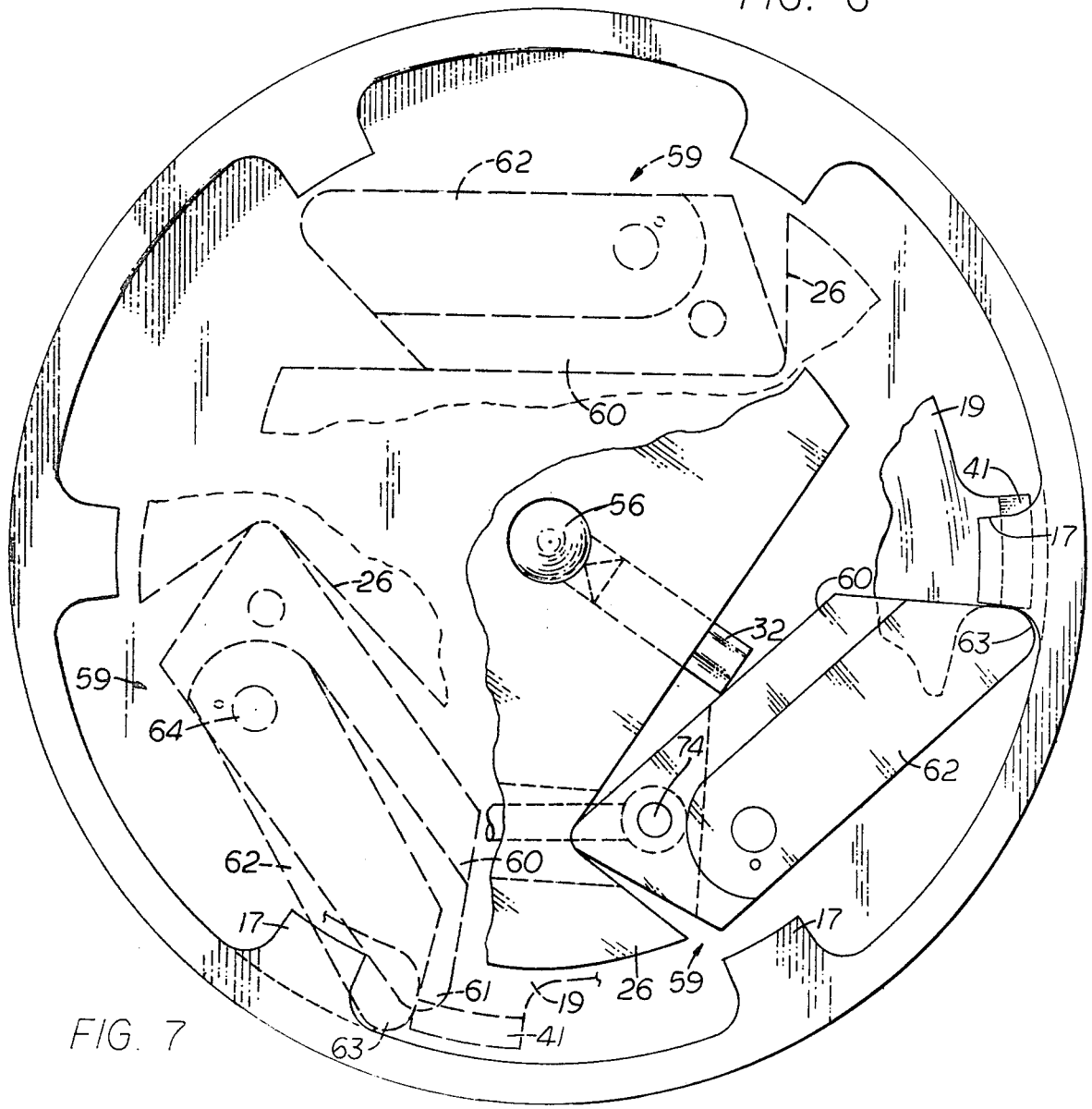
FIG. 7 is a fragmentary, end view of a centrifugal control assembly with a two-piece dog of FIG. 6 positioned relative to teeth of a drum.

When the two pieces 60 and 62 of the dog 59 are assembled, the dog, as shown in solid lines in FIG. 7, has the general shape of the dog 16 of FIGS. 1 and 2. A corner of the main piece 60 (FIG. 6) is cut away starting a short distance from the end adjacent its heel through the end having the toe 61. The end of the cutaway near the heel of the piece 60 is circular, and the end of the auxiliary piece 62 opposite the toe 63 is rounded to fit in the cutaway. The auxiliary piece 62 has the required length and width to fit into the cutaway of the main piece 60 such that the toe 63 appears to be a lateral continuation of the toe 61.

A pintle 64 extends from the axis of the rounded end of the piece 62 through a helical torsional spring 65 and through a bore 66 in the main piece 60. One end 67 of the torsional spring 65 is turned out parallel to the axis of the spring and is inserted in a small bore 68 provided in the inner face of the auxiliary piece 62, and the opposite end 69 is turned out likewise to be inserted in a bore 70 having an opening within a counterbore 71 of the bore 66. When the dog 59 is assembled, a portion of the spring 65 is within the counterbore 71, and the ends of the springs are positioned in the respective bores as required for the spring to urge the toe 63 to its innermost position in line with the toe 61. A bore 72 within the center of the heel of the main piece 60 receives a rod 29 and a spring 30 as shown in FIG. 2 to retain the heel of the dog 59 in the angle of the cutout of the lobe 26, and the rod 29 has, as described above, a nut 31 to be adjusted for determining the speed at which the dog 59 is effective to operate the safety brake 11. The inner end of the rod 29 has a loop (not shown) through which is positioned a pin 74 (FIG. 7) within a lateral bore 73.

The positions of the pieces 60 and 62 of the dog 59 relative to the teeth 17 of the drum 18 and a tab 41 of the actuator 19 for successive positions of operation during resetting are shown in FIG. 7. When engaged for operating the brake 11, the pieces 60 and 62 of the dog 59 are in the position shown in the solid lines, the dog 59 being shown on a fragment of the lobe 26. When the safety brake 11 is being released, the toes of the pieces 60 and 62 are displaced from one another as shown in dashed lines for the first counterclockwise position of the lobe 26. The other position shown in dashed lines for a succeeding counterclockwise position of the lobe 26 is the normal position that corresponds to the normal position of the one-piece dog 16 of FIGS. 1 and 2.

As shown in solid lines, the dog 59 has been rotated about its heel through a small angle from its normal position to an operated position when a cage exceeded a predetermined safe speed. While operated, the toe of the main piece 60 is bearing against the edge of a tooth 17 for connecting the drum 18 during descent of a cage to the input pinion 14 through the shaft 23, and the toe 63 of the auxiliary piece 62 is bearing against the tab 41. The drum is now stopped after the actuator has been effective as described above to apply the brake.

Just after the controls of a hoist have been operated to raise the stopped cage and while the lobe 26 of FIG. 7 is being rotated counterclockwise, the dog 59, as shown in dashed lines, encounters a succeeding tooth 17, and a point of the adjacent side of the piece 60 quite close to the toe 61 contacts an edge of the tooth. Because of the inclination of the side, the piece 60 is easily moved inwardly to ride over the contacted tooth, but unlike the motion of the one-piece dog 16, the piece 60 usually is not returned immediately all the way to its innermost position. The tab 41 of the actuator 19 follows the toe 63 of the auxiliary piece 62 because of the force of the spring washers 38 on the nut 45, and therefore retains the toe 63 in an outward, operated position.

The force of the tab 41 against the toe 63 of the auxiliary piece 62 is effective in two ways to apply movement to the piece 60 about its heel where the heel rests in the angle of the lobe 26. While the toe 63 is held outwardly, torque tending to rotate the toe 61 outwardly is applied by the spring 65 (FIG. 6) that is connected between the pieces 60 and 62. Force tending to rotate the main piece 60 is also applied from the tab 41 through the toe 63, the auxiliary piece 62, and the pin 64 to the main piece 60 at a point off a line between the toe 63 and the heel of the main piece 60, the point being spaced from the line in a direction toward the adjacent teeth 17.

The urging of the main piece 60 outwardly while the tab 41 retains the auxiliary piece 62, provides desired rapid engagement of the main piece 61 with a tooth 17 under marginal conditions of operation. For example, in heavy-duty models having a counterweight traveling in a direction opposite to that of the cage, the sudden application of the brake 11 tends to cause what is aptly described as the yo-yo-effect. When the cage is stopped abruptly in its descent by the safety brake 11, the counterweight is carried upwardly a short distance by its inertia. As the counterweight falls and takes up the slack in the cables by which it is suspended, its inertia raises the cage far enough to cause the main piece 60 to be moved from the tooth 17 that it had engaged and to engage an opposite edge of a successive tooth 17 that tends to return the main piece 60 to its normal position, and if the piece 60 were returned, the cage might again descend until a rapid rate is attained. However, as described above, the engage auxiliary piece 62 urges the toe 61 of the main piece 60 outwardly and therefore the tow engages a tooth 17 immediately as soon as the cage again starts to descend, and thereby stops the yo-yo effect.

Since the motors that drive hoists have speed controls, the controls generally have had to be disabled before the respective cages of the hoists could descend fast enough to test the safety brakes. A feature of the present invention includes means for testing the safety brakes when the speeds of the cages are lower than the maximum speeds permitted by the driving motors. Although testing at a lower speed does not show the speed at which the centrifugal control assemblies of the safety brakes will operate, it does test the effectiveness of the brakes. As described above with reference to FIG. 2, the dog 16 has a pin 32 that extends inwardly to terminate in a bore within the end of the shaft 23, and likewise the dog 59 of FIG. 7 has a similar pin 32. As shown in FIG. 1, a control button 53 is connected to the end of a rod 54, and the rod extends through an axial bore of the ball screw 20. To urge the rod 54 outwardly, a helical compression spring 55 about the rod 54 has one end bearing against the outer end of the ball screw 20 and the other end against the control button 53. The inner end of the control button has a bore for receiving a portion of the spring 55. The rod 54 extends through the ball screw 20 as shown in dashed lines in FIG. 1, and the inner end of the rod 54 terminates in a rounded conical end 56 (FIGS. 1 and 3) that is normally positioned a short distance from the pin 32 (FIG. 2) of the dog 16. When the button 53 is pressed, the conical end of the rod engages the rounded end of the pin 32 to push the dog 16 outwardly a sufficient distance for the toe 28 of the dog to engage a tooth 17 of the drum 18 and also the tab 41 of the actuator 19. Through this testing operation, the brake functions as if the descending speed of the cage of the hoist were high enough to throw out the dog 16, or the dog 59, for operating the brake.

A feature that is particularly applicable to heavy-duty hoists, provides braking while the cages are lightly loaded and are ascending by force of counterweights. To control the rate of ascending, a second dog 57 as shown in FIG. 2 is added to the lobe 26. The heavy-duty hoists in which the second dog 57 is desirable usually have a greater number of braking disks 21 and 22. For example, a light-duty model may use three steel movable braking disks 21 and four bronze fixed braking disks 22, but a heavy-duty model may use nine steel movable braking disks 21 and ten bronze fixed braking disks 22. When the greater number of braking disks are used, the spacer 40 is thinner in an axial direction. Also, in order to have braking in an ascending direction, a required substantial amount of force from the spring washers 38 is constantly applied to press the braking disk 21 and 22 together while the ball screw 20 is in its normal position. This required force can be obtained by using additional numbers of spring washers 38 between the adapter 39 and the supporting disk 42 attached to one end of the ball screw 20. Also as described above for heavy-duty models, the two-piece dogs 59 of FIG. 6 are to be used in place of the dogs 16.

Figure 5:
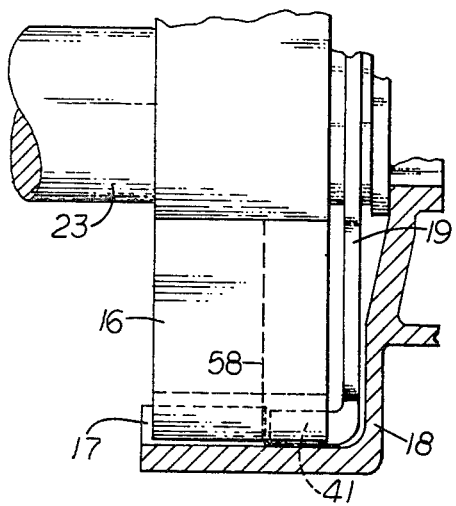
FIG. 5 is a fragmentary cross-sectional view to show positions of dogs of FIG. 2 when operated.

With reference to FIG. 2, the added dog 57 is positioned in an angular portion of the lobe 26 similar and opposite to the angular portion for the dog 59 that in heavy-duty models is preferred in place of the dog 16. The toe of the dog 57 is circumferentially pointed in an opposite direction from the toe 28 of the dog 16, and the dog 57 is not as wide as the dog 16 or about the same width as the toe 61 of the dog 59 (FIG. 6) such that its outer edge is spaced from the outer edge of the lobe 26. The different widths of the dogs 16 and 57 are shown in FIG. 5. As described above, the dog 16 is wide enough to engage a tooth 17 and overlap the tab 41 of the actuator 19. As shown by the dashed line 58 that indicates the position of an edge of the dog 57, the dog 57 when operated engages one of the teeth 17, but is not wide enough to engage the tab 41 of the actuator 19.

In a descending direction, the braking is applied similarly in the different types of brakes described herein. The safety brake 11 with the one-piece dog 16 of FIGS. 1 and 2 operates in a descending direction when the pinion 14 that engages the rack 15 reaches a rate sufficient to throw out the toe 28 of the dog 16. In its outer position, the toe 28 (FIG. 2) engages one of the teeth 17 and also one of the tabs 41 of the actuator 19 (FIG. 1). When a two-piece dog 59 of FIG. 6 is used in place of the dog 16, both pieces 60 and 62 are thrown out simultaneously for the piece 60 to contact a tooth 17 and for the piece 62 to contact the actuator 19. The actuator 19 rotates the ball screw 20 until the cage is stopped. Since the ball screw 20 is fixed axially and the nut 45 is retained from rotation, the nut 45 is moved inwardly against the stack of Belleville washers 38. Force is applied from the opposite end of the stack of washers 38 to the small inner flange of the adapter 39 to press the outer edge of the adapter 39 against the annular spacer 40. As the screw continues to turn, an increasing amount of force is applied through the spacer 40 to compress the braking disks 21 and 22 between the spacer 40 and an outer surface of the drum 18. Since the disks 21 are fixed to the drum 33, and the interleaved disks 22 are prevented from being rotated by their pheripherial connection to the housing of the safety brake 11, an increasing braking force is applied to the drum 33 and therefore through the dog 16 to the input shaft 23 until the cage is stopped. Also, as the brake is being applied, a switch (not shown) is operated to interrupt the power from a driving motor. For example, a microswitch with an arm can be positioned conveniently within the end 46 of the housing and the arm contact the outer face of the supporting disk 42. When the supporting disk 42 is moved inwardly as braking is initially applied, the microswitch will be actuated to control a relay for interrupting power to the driving motor of the cage.

The safety brake of this invention can be very easily reset by merely operating the usual controls of a hoist for raising the cage. When the brake 11 has a one-piece dog 16, as the hoist is first raised and the pinion 14 rotates in an opposite direction, the tooth 28 (FIG. 2) of the dog 16 is disengaged from the curved portion of a tooth 17, and the dog 16 is free to be returned by a succeeding tooth 17 and its spring 30 to its normal position where it is held by the spring 30. When the dog 16 is in its normal position, it is no longer in the path of the tabs 41 of the actuator 19. During rotation of the ball screw 20 for applying the brake, the supporting disk 42 was moved away from the nut 51 and from the spring washers 20. Therefore, the nut 45 can be moved outwardly easily by the spring washers 38 to rotate the ball screw 20. The ball screw 20 is rotated until the nut 45 is returned to its normal position tightly against the spring washers 50.

As described above, heavy-duty models of the brake 11 have sufficient spring washers 38 to provide a moderate amount of braking even though the ball screw 20 is not operated. This amount of braking is sufficient to retard the motion of the cage of a hoist, but is not sufficient to be destructive to the dogs 59 (FIGS. 6 and 7) and 57 (FIG. 2) and the other parts of the hoist. As a cage of a heavy-duty hoist ascends above a predetermined speed from force supplied by its counterweight, the dog 57 is thrown outwardly to engage a tooth 17, but it does not engage the actuator 41. The moderate amount of initial braking force is therefore aplied to the cage to slow its movement. As described above in detail with reference to FIG. 7 for heavy-duty models, a two-piece dog 59 is preferably used in place of the dog 16. An auxiliary piece 62 of the dog 59 functions to control the rate of rotation of the screw 20 while it is being reset after the brake 11 has operated to stop rapid descent of a cage.

I claim:

1. In a safety brake to be connected between first and second members of a machine, said safety brake operative to stop motion between said members in response to the relative rate of motion between said members exceeding a predetermined safe speed in at least one direction of forward and reverse directions of said second member with respect to said first member, an automatically resetting actuator to control an amount of braking provided by said safety brake;

said safety brake being the type having a fixed braking member and a movable braking member with adjacent respective frictional surfaces, said first member of said machine being connected to said fixed braking member, said second member of said machine at least while said safety brake is operative to stop movement of said second member in said forward direction being connected to said movable braking member and movable only therewith, said second member being movable in said reverse direction independent of the movement of said movable braking member, a centrifugal control assembly having an input connected to said second member of said machine, said centrifugal control assembly being movable in forward and reverse directions in response to movement of said second member with respect to said first member in forward and reverse directions respectively;

said automatic resetting actuator comprising:

a screw assembly including an antifrictional screw, said screw having a head portion, a radially extending actuating member fixed to said antifrictional screw, a nut assembly including a nut having a threaded portion engaging said anti-frictional screw and a non-rotatable member connected to said nut to prevent rotation of said nut, bearing means disposed between said head portion of said antifrictional screw and said movable braking member, compressible spring means disposed between said nut and said fixed braking member, said bearing means and said spring means being aligned to press said braking members together for increasing amounts of braking as said nut is moved inwardly along said antifrictional screw, said actuating member of said antifrictional screw disposed opposite said centrifugal control assembly, said centrifugal control assembly operating in response to said speed of said second member of said machine exceeding said predetermined safe speed to contact said actuating member, said actuating member upon being contacted rotating said antifrictional screw in a first direction for moving said nut inwardly for increasing braking until said movable braking member and said second member connected thereto are stopped, and said centrifugal control assembly being moved in said reverse direction in response to movement of said second member in said reverse direction, said actuating member thereby being permitted to be rotated in said reverse direction from force applied by said spring means to said nut, said antifrictional screw being rotated in a second direction opposite from said first direction for releasing automatically the braking that has been applied by said operation of said centrifugal control assembly.

2. A safety brake as claimed in claim 1 wherein said movable braking member has a drum about said centrifugal control assembly, said drum being rotatable about the axis thereof and having at least one tooth on the inside surface thereof, said centrifugal control assembly having a first dog rotatable about said axis and movable outwardly in response to said relative rate in said forward direction exceeding said predetermined speed, said first dog upon moving outwardly contacting said tooth to connect said movable braking member to said second member of said machine, said actuating member having a portion disposed adjacent the path taken by said tooth during rotation of said drum, and said first dog having a portion extending beyond said tooth to overlap and to contact said adjacent portion of said actuator for rotating said antifrictional screw.

3. A safety brake as claimed in claim 2 wherein said first dog has a main piece and an auxiliary piece, said auxiliary piece being connected by a pivot to said main piece, said main piece being movable outwardly to engage said tooth, said auxiliary piece being said portion extending beyond said tooth for contacting said adjacent portion of said actuator, means connected between said main piece and said auxiliary piece for urging said auxiliary piece to a normal position in alignment with said main piece, said auxiliary piece while contacting said actuator and while said centrifugal control assembly is operated in said reverse direction being retained outwardly by force of said actuator until said actuator has rotated in said reverse direction to the extent required for resetting said actuator, and said main piece being rotated inwardly with respect to said auxiliary piece by contact with said tooth during operation of said centrifugal control assembly in said reverse direction before said actuator is fully reset.

4. A safety brake as claimed in claim 3 wherein said centrifugal control assembly has within said drum a lobe connected to said second member of said machine, said main piece of said first dog having a heel pivotally connected to said lobe, and said pivot of said auxiliary piece being spaced from a line that extends from said heel of said main piece to said auxiliary piece at a point contacted by said actuator, said pivot being in the direction from said line as required for force applied from said actuator to said auxiliary piece to tend to rotate said main piece outwardly in the direction for engagement with said tooth.

5. A safety brake as claimed in claim 2 wherein said centrifugal control assembly has a second dog opposite said tooth, said second dog being operable in response to said input of said control assembly being operated in said reverse direction at a rate greater than a second predetermined speed to contact said tooth and thereby to connect said movable braking member to said second member of said machine, and said compressible spring means being set to apply normally substantial force between said braking members and thereby to provide a substantial amount of braking in said reverse direction that is less than the amount applied in said forward direction by operation of said automatically resetting actuator.

6. A safety brake as claimed in claim 2 wherein said centrifugal control assembly has within said drum a lobe connected to said second member of said machine, said first dog being pivotally connected to said lobe, said lobe having on said axis of said drum an axial bore therethrough and having a radial bore extending from said axial bore, a pin extending through said radial bore and having one end terminating on a side of said first dog adjacent said lobe and the other end terminating in a radial direction within said axial bore, said pin being a sliding fit within said radial bore in said lobe, a control rod having an end terminating within said axial bore of said lobe, said control rod being movable longitudinally, means for urging said rod to a normal position where said end of said rod is a short distance from a position in line with said other end of said pin, said rod being movable at will to press said end of said rod against and over said other end of said pin, said pin of said rod and said other end of said pin being inclined one to the other for pressing said first dog outwardly far enough to engage said tooth for operating said safety brake.

* * * * *